(12) United States Patent
Lawrence (10) Patent No.: US 10,819,460 B2
(45) Date of Patent: *Oct. 27, 2020

(54) HIGH CAPACITY AND RESILIENCE OPTICAL NETWORK DESIGN

(71) Applicant: FRONTIER COMMUNICATIONS CORPORATION, Norwalk, CT (US)

(72) Inventor: Jonathan Gordon Lawrence, Newtown, CT (US)

(73) Assignee: FRONTIER COMMUNICATIONS CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,054

(22) Filed: Jun. 11, 2019

(65) Prior Publication Data
US 2019/0312663 A1    Oct. 10, 2019

Related U.S. Application Data

(62) Division of application No. 15/729,340, filed on Oct. 10, 2017, now Pat. No. 10,374,746.

(60) Provisional application No. 62/406,156, filed on Oct. 10, 2016.

(51) Int. Cl.
| | | |
|---|---|---|
| *H04B 10/00* | (2013.01) | |
| *H04J 14/02* | (2006.01) | |
| *H04B 10/071* | (2013.01) | |
| *H04L 5/14* | (2006.01) | |
| *H04B 10/25* | (2013.01) | |
| *H04B 10/27* | (2013.01) | |

(52) U.S. Cl.
CPC ........ *H04J 14/0278* (2013.01); *H04B 10/071* (2013.01); *H04B 10/25* (2013.01); *H04B 10/27* (2013.01); *H04L 5/14* (2013.01)

(58) Field of Classification Search
USPC .............................. 398/1–8, 66–73, 115–117
See application file for complete search history.

(56) References Cited

U.S. PATENT DOCUMENTS

| | | | | |
|---|---|---|---|---|
| 6,832,046 B1* | 12/2004 | Thomas | .............. | H04J 14/0227 398/72 |
| 7,054,522 B1* | 5/2006 | Han | ........................ | H04J 14/02 385/24 |
| 7,280,470 B2* | 10/2007 | Shiragaki | ............ | H04J 14/0212 370/223 |
| 7,359,592 B2* | 4/2008 | Truong | .............. | H04B 10/2581 385/24 |

(Continued)

OTHER PUBLICATIONS

Alcatel-Lucent 7360, Intelligent Services Access Manager FX | Release 5.1.00; ANSI Hardware Installation Manual; 3FE 56067 AAAA TCZZA Edition 3, Sep. 2014.

(Continued)

*Primary Examiner* — Agustin Bello
(74) *Attorney, Agent, or Firm* — Day Pitney LLP (57) ABSTRACT

An optical network is provided that includes at least one strand of a plurality of strands of optical fiber optically connected to a first fiber distribution hub and an access terminal. The at least one strand optically is also connected to a second fiber distribution hub and the access terminal. The at least one strand thus provides a full duplex optical path in a first direction from the first fiber distribution hub to the access terminal and in a second direction from the second fiber distribution hub to the access terminal.

10 Claims, 6 Drawing Sheets

100

(56) References Cited

U.S. PATENT DOCUMENTS

| | | | | |
|---|---|---|---|---|
| 7,609,967 | B2* | 10/2009 | Hochbaum | H04J 14/0226 398/100 |
| 7,848,643 | B2* | 12/2010 | Chung | H04J 14/0226 398/5 |
| 8,005,361 | B2* | 8/2011 | Nakaishi | H04J 3/0682 398/67 |
| 8,538,261 | B2* | 9/2013 | Johansson | H04B 10/272 398/10 |
| 8,559,818 | B2* | 10/2013 | Zimmel | H04B 10/27 398/71 |
| 8,992,099 | B2* | 3/2015 | Blackwell, Jr. | H05K 7/14 385/88 |
| 9,049,500 | B2* | 6/2015 | Conner | H04B 10/27 |
| 9,720,197 | B2* | 8/2017 | Cox | G02B 6/4452 |
| 2003/0058505 | A1* | 3/2003 | Arol | H04J 14/0227 398/168 |
| 2004/0218534 | A1* | 11/2004 | Song | H04Q 11/0067 370/236.2 |
| 2004/0264961 | A1* | 12/2004 | Nam | H04Q 11/0067 398/58 |
| 2006/0133809 | A1* | 6/2006 | Chow | H04J 3/1694 398/66 |
| 2009/0220231 | A1* | 9/2009 | Zimmel | H04B 10/25 398/72 |
| 2009/0290866 | A1* | 11/2009 | Chung | H04J 14/0226 398/5 |
| 2011/0268438 | A1* | 11/2011 | Daems | G01M 11/3136 398/16 |
| 2012/0033973 | A1* | 2/2012 | Trojer | H04J 14/0282 398/72 |
| 2012/0148241 | A1* | 6/2012 | Piehler | G02B 6/4246 398/49 |
| 2012/0237213 | A1* | 9/2012 | Yin | H04L 43/50 398/28 |
| 2012/0321255 | A1* | 12/2012 | Kewitsch | G02B 6/3502 385/78 |
| 2014/0072296 | A1* | 3/2014 | Montalvo Garcia | G01M 11/3127 398/16 |
| 2014/0072305 | A1* | 3/2014 | McEwan | H04B 10/2503 398/72 |
| 2014/0233952 | A1* | 8/2014 | Zimmel | H04J 14/0226 398/68 |
| 2015/0043909 | A1* | 2/2015 | Trojer | H04J 14/0282 398/38 |
| 2015/0230008 | A1* | 8/2015 | Elford | H04Q 11/0067 398/66 |
| 2015/0249520 | A1* | 9/2015 | Badar | H04J 14/0245 398/79 |
| 2015/0263805 | A1* | 9/2015 | Shrikhande | H04J 3/14 398/23 |
| 2015/0331199 | A1* | 11/2015 | Kewitsch | G02B 6/3502 385/17 |
| 2016/0112779 | A1* | 4/2016 | Barnett, Jr. | H04Q 11/0067 398/45 |
| 2016/0191152 | A1* | 6/2016 | Soto | G01M 11/3172 398/16 |
| 2018/0076890 | A1* | 3/2018 | Ruchet | H04B 10/07955 |
| 2019/0312663 | A1* | 10/2019 | Lawrence | H04B 10/071 |

OTHER PUBLICATIONS

FieldSmart® Fiber Scalability Center (FSC), PON Cabinets: 288, 432, 576 and 1,152 Ports; v.4.16, Apr. 2016.

COMMSCOPE®, "GPON High density, High Capacity Optical Line Terminal Platform, basic system set with chassis, two switching and CPU modules, three fan modules, power cord, and two dc power supplies"; Product Specifications—760171413 | C9264, Aug. 16, 2016.

International Telecommunication Union, "Gigabit-capable passive optical networks (GPON): General Characteristics"; Series G: Transmission Systems and Media, Digital Systems and Networks; G.984.1, Mar. 2008.

International Telecommunication Union, "Gigabit-capable passive optical networks (GPON): General characteristics"; Series G: Transmission Systems and Media, Digital Systems and Networks; G.984.1, Amendment 1, Oct. 2009.

International Telecommunication Union, Gigabit-capable passive optical networks (GPON): General characteristics; Series G: Transmission Systems and Media, Digital Systems and Networks; G.984.1, Amendment 2, Apr. 2012.

COMMSCOPE®, "GPON Optical Network Unit, four 10/100/1000 Base-T subscriber ports"; Product Specifications 760172957 | CS-9004A; Aug. 16, 2016.

Non-Final Office Action issued in U.S. Appl. No. 15/729,340, dated May 31, 2018.

Final Office Action issued in U.S. Appl. No. 15/729,340, dated Feb. 8, 2019.

* cited by examiner

FIG. 1

Typical example of assignments for 8 Port Terminal

| | E or W | Fiber East | Fiber "A" West |
|---|---|---|---|
| Port 1 | East | 1 | |
| Port 2 | West | | A1 |
| Port 3 | East | 2 | |
| Port 4 | West | | A2 |
| Port 5 | East | 3 | |
| Port 6 | West | | A3 |
| Port 7 | East | 4 | |
| Port 8 | West | | A4 |

HIGH CAPACITY AND RESILIENCE OPTICAL NETWORK DESIGN

CROSS REFERENCE TO RELATED APPLICATION

This patent application is a division of and claims the benefit of Priority to U.S. patent application Ser. No. 15/729,340, filed on Oct. 10, 2017, which claims the benefit of priority to U.S. Provisional Patent Application Ser. No. 62/406,156, filed on Oct. 10, 2016, the content of each of the referenced patent applications is incorporated herein by reference in its entirety for any purpose whatsoever.

BACKGROUND OF THE INVENTION

1. Field of the Invention

The invention disclosed herein relates to designs for fiber optic networks, and in particular, to design modifications to a Passive Optical Network (PON), such as a Gigabit Passive Optical Network (GPON).

2. Description of the Related Art

A variety of technologies enable media communications. Among them are passive optical networks (PONs). Generally, passive optical networks (PONs) are short-haul networks of fiber-optical cable that provide, for example, Internet access, voice over Internet protocol (VoIP), and digital TV delivery in metropolitan areas.

A passive optical network (PON) is a fiber network that uses fiber and passive components like splitters and combiners rather than active components like amplifiers, repeaters, or shaping circuits. Such networks cost significantly less than those using active components. The main disadvantage is a shorter range of coverage limited by signal strength. While an active optical network (AON) can cover a range to about 100 km (62 miles), a PON is typically limited to fiber cable runs of up to 20 km (12 miles). PONs may also be referred to as "fiber to the home (FTTH)" networks.

Most current networks implement an architecture referred to as "Gigabit PON (GPON)." Gigabit-capable passive optical networks (GPON) are described in an International Telecommunications Union Standard, ITU-T G.984.1 (ITU-T G.984.1 (March 2008)), entitled "Gigabit-capable passive optical networks (GPON): General Characteristics," which is incorporated by reference herein in its entirety along with related standards as may be referenced therein or as supplements thereto.

GPON uses optical wavelength division multiplexing (WDM) so a single fiber can be used for both downstream and upstream data. For example, in some embodiments, a wavelength (λ) of 1490 nm transmits downstream data and a wavelength of 1310 nm is used for upstream data. A wavelength of 1550 nm is reserved for uses such as video transmission.

Generally, fiber to the home (FTTH) networks are point to point low loss fiber optic paths linking a central office with customers. Typically, the central office maintains active (or powered) equipment for communication with the customer via a passive optical path. The passive optical path may include anywhere from two (2) to sixty four (64) passive optical splitters or more to expand the fiber network.

Most traditional GPON networks currently deployed, do not provide for a service and protect redundant path that can fail-over to protect in the event of loss of service on the active path. The expense of providing two redundant paths for each customer would more than double the costs of construction, materials, and equipment and maintenance costs.

Additionally, some government entities may regulate the minimum levels of service that each service provider offers. More often, Service Level Agreements (SLA's), contracts between the GPON Provider and the end user/customer dictate the minimum service levels, restoration times, and levels of redundancy, and penalties for non-performance. Widespread outages and long restoration and service recovery times may have serious consequences from regulatory agencies, provider reputation, customer goodwill, and costly penalties for the GPON provider. Poor customer service may be leveraged by other GPON competitors and result in mass customer exodus.

Traditional fiber networks implementing GPON are inherently vulnerable to service interruptions. This is due their unprotected configurations (not Redundant with Service and Protect fiber paths). A loss of a single fiber strand failure may affect up to sixty four (64) or more customers, depending on the configuration.

Many GPON construction projects are built with outside contract labor, and poorly supported after commissioning. This leaves the provider and the GPON network at risk during events such as natural disasters, such as storms, rodent damage, construction activities, tree and pole damage, power burns and lightning strikes. This risk can be mitigated with a comprehensive emergency maintenance program. Generally, implementation of adequate emergency maintenance programs to address such commonly occurring risks require continuous availability of a sizable inventory of repair fiber reels, equipment and materials, as well as trained in-house personnel.

What are needed are designs for gigabit passive optical networks (GPON) that streamline restoration efforts. Preferably, the designs provide for pre-staging diverse alternate fiber paths which will become available in the event of an outage on the original fiber path. Additionally, such designs should provide for enhanced system operation during normal operational conditions.

SUMMARY OF THE INVENTION

In one embodiment, a gigabit passive optical network (GPON) is disclosed. The GPON includes: at least one strand of optical fiber optically coupled to a fiber distribution hub and terminating at a termination port, the strand optically coupled to another termination port, the strand thus configured to provide a full duplex optical path for the GPON.

The termination port may be associated with one of another fiber distribution hub, an access terminal, an optical network termination unit and an optical line termination. The strand of optical fiber may include a single-mode optical fiber. Optical coupling of the strand to another termination port may include a splice to the strand, and the splice may include one of a fiber loop back plug and an optical fiber jumper, further the splice may include an optical coupling to a pigtail of the strand. The gigabit passive optical network (GPON) may include at least another fiber distribution hub optically linked to the fiber distribution hub, and the fiber distribution hub optically linked to fiber distribution hub may be configured in an East West distribution design.

In another embodiment, a method for providing communications service using a gigabit passive optical network (GPON), is provided. The method includes: configuring the GPON with a plurality of strands of optical fiber that are optically coupled to at least one fiber distribution hub and terminating at respective termination ports, and optically coupling each one of the strands to another respective termination port, each of the strands thus configured to provide a full duplex optical path for the GPON; communicating optical signals through the GPON; and upon loss of service to a subscriber on a communications pathway, switching communication from a first fiber distribution hub to another fiber distribution hub to restore service to the subscriber.

Optically coupling the strands of optical fiber may include splicing each strand to one of a fiber loop back plug and an optical fiber jumper. The method may include switching communication at a splitter of the GPON. Optically coupling each one of the strands to another respective termination port may include: selecting, for each one of the strands, a respective termination port that is associated with one of another fiber distribution hub, an access terminal, an optical network termination unit and an optical line termination.

In yet another embodiment, a method for evaluating performance of a gigabit passive optical network (GPON) is provided. The method includes: configuring the GPON with a plurality of strands of optical fiber that are optically coupled to at least one fiber distribution hub and terminating at respective termination ports, and optically coupling each one of the strands to another respective termination port, each of the strands thus configured to provide a full duplex optical path for the GPON; and performing optical time-domain reflectometer (OTDR) measurements at the at least one fiber distribution hub.

In a further embodiment, a method for configuring a gigabit passive optical network (GPON) is provided. The method includes optically coupling at least one strand of optical fiber to a fiber distribution hub and terminating the strand at a termination port; and optically coupling the strand to another termination port, the strand thus configured to provide a full duplex optical path for the GPON.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for implementations of single-mode optical fiber in a gigabit passive optical network (GPON). Generally, the aspects disclosed herein provide for enhanced capacity and reliability in deployments of GPON. Designs disclosed herein make use of GPON system components including, for example, equipment in a central office (CO), a fiber distribution from the central office (CO) to a fiber distribution hub (FDH), a centralized splitter (that may be implemented as a single splitter or as distributed (multiple) passive optical splitters), fiber distribution cable(s) in one or more fiber cable sheaths, fiber terminals, fiber drop cables used to feed each subscriber and an optical network terminal (ONT). Designs provided enhance fiber usage between the FDH and the subscribers, and may further provide a diverse path from two (2) or more FDH's for outage prevention and rapid recovery.

More specifically, the designs disclosed herein result in distribution fiber deployments for increasing fiber utilization up to 200% between the FDH and the fiber terminal as well as increases in network reliability. The increases in network reliability serve to reduce risk of fiber related outages by about 50% and enable expedited fiber restoration. These advantages may be realized by use of diverse routing and built in patching solutions for the PON circuits from the central office or in the distribution fiber cables.

Figure 1:
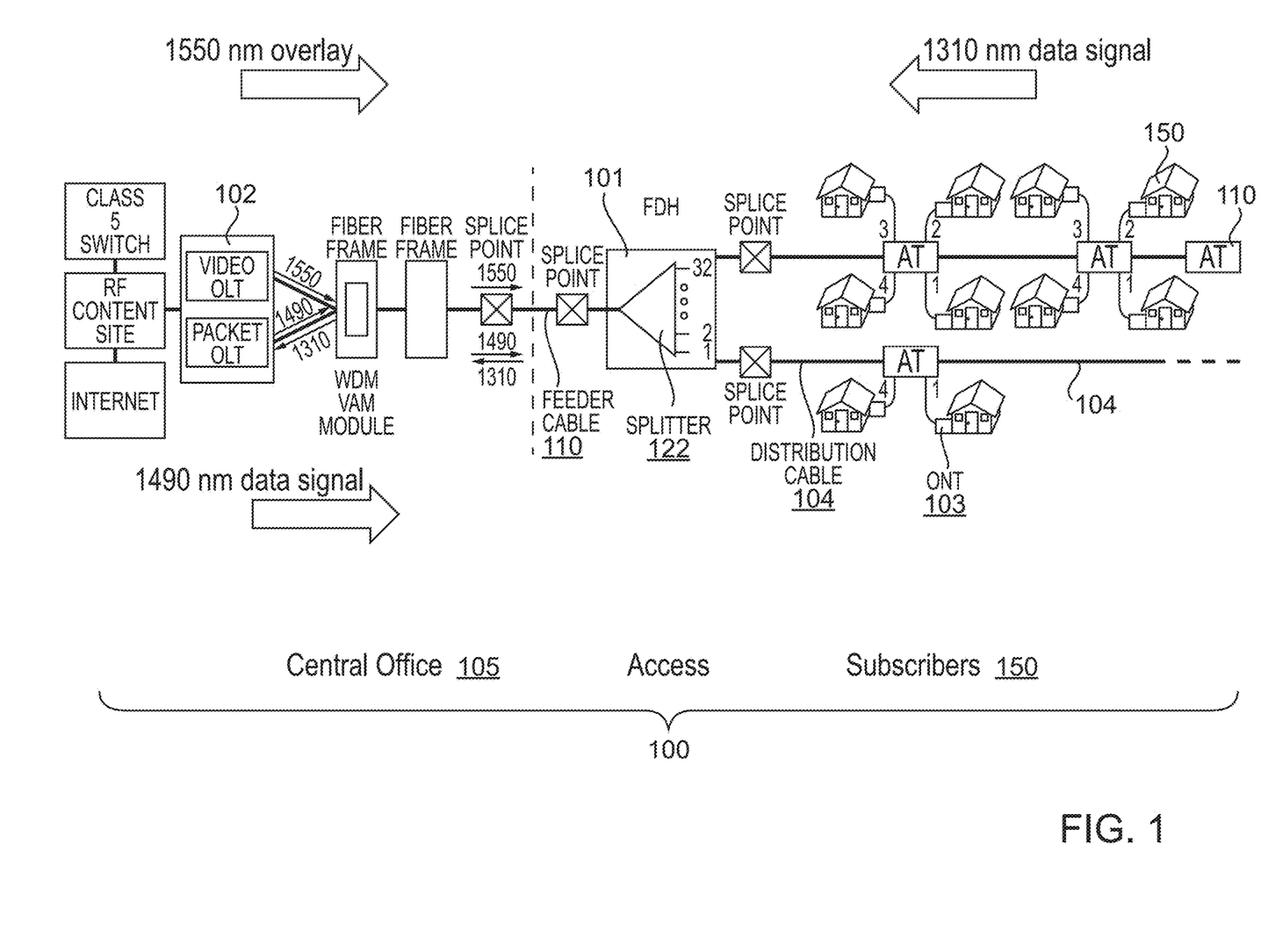
FIG. 1 is an schematic diagram depicting aspects of a configuration for a gigabit passive optical network (GPON)

In order to provide some context for the teachings herein, an exemplary embodiment of a gigabit passive optical network (GPON) is illustrated in FIG. 1.

In FIG. 1, a gigabit passive optical network (GPON) 100 includes a fiber distribution hub (FDH) 101. Generally, the fiber distribution hub (FDH) 101 is an enclosure that contains connections between fiber optic cables and passive optical splitters in the GPON 100. The FDH 101 provides a convenient location for servicing connections, making reconfigurations, and testing of the GPON 100. One example of an FDH 101 is the FDH 4000 Sealed Fiber Distribution Hub, available from CommScope, Inc. of Hickory, N.C. (a description of which is included herewith in an Information Disclosure Statement (IDS) and incorporated for any purpose whatsoever).

Generally, the FDH 101 is optically coupled to a central office 105 and a plurality of subscribers 150. Optical coupling of the central office 105 with the FDH 101 is by a feeder cable 110. Optical coupling of the central office 105 with the FDH 101 is by a feeder cable 110. Optical coupling of the plurality of subscribers 150 with the FDH 101 is by a distribution cable 104.

In the central office 105, an optical line termination (OLT) 102 includes equipment for making external connections to the Internet, content providers and the like. An example of an OLT 102 is the GPON High density, High Capacity Optical Line Terminal Platform, model no. 760171413, C9264 available from CommScope, Inc. of Hickory, N.C. (a description of which is included herewith in an Information Disclosure Statement (IDS) and incorporated for any purpose whatsoever).

The distribution cable 104 contains a plurality of individual optical fibers. In this example, the optical fibers are single-mode optical fibers. Each of the optical fibers is optically coupled to an access terminal (AT) 110 by an optical network termination (ONT) 103 (the optical network termination (ONT) 103 may also be referred to as an optical network unit (ONU)). Generally, the optical network termination (ONT) 103 provides for conversion of optical signals to electrical signals suited for processing tasks with conventional processors. An example of an optical network unit is GPON Optical Network Unit, model no. 760172957, CS-9004A, available from CommScope, Inc. of Hickory, N.C. (a description of which is included herewith in an Information Disclosure Statement (IDS) and incorporated for any purpose whatsoever). Connected to each of the optical network termination (ONT) 103 may be one or more subscribers 150.

In the GPON 100, optical wavelength division multiplexing (WDM) is used so a single optical fiber can be used for both downstream and upstream data. Generally, a wavelength (λ) of 1490 nm transmits downstream data and a wavelength of 1310 nm is used for upstream data. A wavelength of 1550 nm may be used as an overlay for uses such as video transmission.

Although the GPON 100 is disclosed herein with regard to certain uses of certain wavelengths, it should be recognized that this is merely illustrative and is not limiting of the disclosed technology. For example, other wavelengths may be used. In addition, communications protocols other than those set forth herein may be employed. More specifically, and by way of example, in some embodiments, no overlay is used. Rather, packets may be communicated via time division multiple access (TDMA) protocols, and encryption may be employed. A variety of adjustments from what is set forth herein may be made.

The exemplary embodiment of the GPON 100 that is depicted in FIG. 1 is simplified. It should be recognized that a variety of designs for passive optical networks (PON) may be implemented. For example, other designs may include, without limitation, additional fiber distribution hub(s) 101, additional distribution cables 104 (which may interconnect FDH), distributed splitting, centralized splitting and other such components. In some embodiments, such as where multiple FDH 101 are implemented, communications traffic (and/or related system components) may be designated by directional terminology. In a non-limiting example, where the GPON implements a ring, certain components may be considered to be "East" or "West," while fiber and/or signals may be "Eastbound" or "Westbound." Such designations are merely arbitrary and are conventions adopted for purposes of explanation only. Use of such terminology is not to imply any physical relationship between components beyond that which is stated herein.

The GPON 100 may include one or more passive optical splitters between the OLT 102 in the office and the ONT/ONU 103 at the premises of the customer 150. In the passive optical splitter 122, no power is required to split the optical signal or generate multiple wavelengths of light. Optical splitters 122 may be used to passively split the broadcast downstream signal (1490, 1550 nm or other wavelength) with derived signals (referred to as "splits") ranging from two (2) to 128 portions. Each output of the splitters 122 are individually connected via a single fiber to the ONT 103 for a respective customer 150. Data packets are broadcast on a single fiber (downstream) to the splitter(s) 122 and may be encrypted so that only the packets intended for each ONT 103 are received and processed. In the case of a 32-way split (that is, one fiber split thirty two (32) ways), post-split, each of the thirty two (32) output fibers will have up to thirty two (32) encrypted (AES) data packets transmitted to all thirty two (32) of the ONT's. However, only the designated ONT 103 can decrypt their respective encrypted packet. These splitters 122 in the upstream direction (1310 nm) act as an optical combiner or aggregator, but instead of broadcasting an upstream signal back to the OLT 102, each ONT 103 is assigned their own unique timeslot using a format, such as time division multiple access (TDMA), which the OLT 102 can decipher. The use of passive optical splitters 122 in the GPON 100 allows for an economical model of optically connecting multiple customers without dedicating an optical point-to-point circuit between the OLT 102 and the ONT 103 for each customer 150.

In some embodiments, a splitter (for example, a 2-way up to a 128-way splitter) would be located at the FDH 101. The n-way splitter would be fed with a fiber from the OLT 102 and be connected to n number of fibers and to n number of ONT/Customers. A 288 FDH can support nine (9) 32-way (1×32) splitters, requiring only nine (9) fiber strands from the OLT 102. Thus, an office 105 may be located up to thirty six (36) miles away and feed up to 288 customers. This design eliminates the need to run a 288 count fiber sheath up to thirty six (36) miles, and permits servicing of each customer only using nine (9) fibers. The FDH 101, nevertheless, feeds 288 customers from the splitters to each ONT 103 on a single fiber via the 288 terminated fiber connection in the FDH 101.

Distributed or cascaded splitters 122 involve the use of one or more passive optical splitter between the FDH 101 and the ONT 103 for each respective customer 150. In some embodiments, design of a given GPON 100 limits the maximum number of splits to 32, 64, or 128. The higher the split, the lower the data speeds that can be provisioned. For example, with a 32-way split, data speeds of 1 Gbps/1 Gbps would be possible concurrently for each of the thirty two (32) customers, whereas with a 64-way split the available bandwidth and performance would be about half that. By placing on the same circuit an 8-way splitter 122 in one location (for example, at the FDH 101) and 4-way splitters 122 in other locations (for example, at the pole or side of multi-family house), the overall split is still thirty two (32). It should be noted, however, that optical splitters create insertion loss or attenuation of the optical signal, typically about 3.5 dB per 2-way split, a 4-way split is about 7 dB, an 8-way split is about 10.5, a 16-way split about 14, and 32-way split about 17-18 dB. Whether two splitters that total thirty two (32) are cascaded, or one 32-way splitter is used, the total losses are almost identical. As optical loss budgeting is an important design parameter, most GPON systems have an operating window of between about −5 to −30 dBm.

Using a distributed split design helps to maximize capacity of the FDH 101 as well as the distribution fiber 104. To illustrate this, consider two sixteen (16) unit multiple dwelling unit (MDU) properties. Each MDU is fed by a 288 count FDH 101 with a centralized 32-way splitter. In order to service the two MDUs, all thirty two (32) splits would be used and thirty two (32) strands/ports in the FDH 101 in the distribution cable 104 would be used to provide up to four (4) 8-port terminals with a run of thirty two (32) fiber drops to each unit. Considering the same scenario with a design for distributed splitting, in one embodiment, a 2-way splitter would be placed at the FDH 101 and coupled to two distribution cables 104, one each to the respective MDU's. A 16-way splitter would be placed at each MDU and each 16-way splitter would be fed by a single fiber drop, thus feeding thirty two (32) customers with two distribution fibers 104 instead of thirty two (32) strands. In this design, the optical loss is still about 17 dB for each customer 150, but the FDH 101 still has 286 fibers remaining. In a centralized split architecture, the 288 FDH count correlates to a one-for-one customer (288) count. In a distributed split architecture, the single 288 count FDH 101, can easily feed 1000 customers or more at just a 4× utilization rate. That is, one distribution fiber 104 and a cascaded splitter 122 may serve many customers.

The East-West design is agnostic to either a centralized or distributed architecture. In fact, as can be seen by the increase in customer counts at the FDH using the cascading splits, the need for a more resilient and survivable fiber design is critical. In addition, the East-West design can also accommodate non GPON optical circuits such as point-to-point Ethernet circuits which bypass splitters or may include transmit (TX) and receive (RX) paths as well as ring designs.

Generally, cables of optical fiber implemented in the GPON 100 exhibit a physical appearance of a cable or a ribbon. In some embodiments, the cable of optical fiber may be a grouping of separately sheathed individual strands of optical fiber. Regardless of form, a fundamental element of each cable of optical fiber is a strand of optical fiber. Each strand provides a communications channel, and may be individually optically coupled as well as spliced commensurate with the techniques described herein as well as others known in the art.

Generally, the GPON 100 makes use of single-mode optical fiber. A single-mode optical fiber is an optical fiber designed to carry light only directly down the fiber in a transverse mode. All optical signals have the same mode but may have different frequencies. Multi-mode optical fiber is less expensive than single-mode optical fiber. Because multi-mode optical fiber has a larger core-size than single-mode optical fiber, the multi-mode optical fiber supports more than one propagation mode. Over longer distances, multi-mode optical fiber is limited by modal dispersion, while single mode optical fiber is not. Accordingly, while it is possible to implement multi-mode optical fiber in at least some portions of the GPON 100, longer distances are usually served by single-mode optical fiber.

Traditional distribution fiber designs do not use the A-counts at each termination location. In the case of a terminal cut-in with eight (8) ports, the fiber ribbon or strand of optical fiber within a loose buffer tube must be physically accessed. The individual fibers are then cut to splice to a pigtail for each port. In this case, a 144 count optical fiber would have twelve (12) optical fiber ribbons or twelve (12) buffer tubes of twelve (12) loose optical fibers each. The remaining express eleven (11) ribbons or tubes would be left intact and the four (4) unused optical fibers in the ribbon or tube would be left intact and not cut. The eight (8) strands of optical fiber would be cut and then fused to the eight (8) pigtails to activate the eight (8) ports. The out end of the eight (8) optical fibers would then be cut dead ahead. At this point, the fiber count of the sheath leaving the first terminal would be LG01, 9-144, A, 1-8, to identify the 136 live optical fibers remaining and the eight (8) optical fiber dead count (the "A-count"). At the 18th terminal, the fiber sheath count would be LG01, 137-144, A, 1-136.

Traditional designs for passive optical networks (PON) have attempted to address this wasteful A-count in the past. For example, some designs have relied upon customized tapered cables of optical fiber that would taper these fiber counts within the sheath to mirror the deployment design, or accept the incremental A-Counts along the fiber span and use standard consistent fiber count cables to avoid the lead time penalties associated with customized tapered fiber cables.

Accordingly and among other things, the design incorporates splicing of an optical fiber connection at a fiber optic terminal port to the Eastbound fibers and Westbound fibers, thus eliminating the A-counts and providing two (2) active ports on the same fiber strand within the terminal. Thus, a single strand of optical fiber may be used to provide a full duplex optical path to each subscriber without creating unused fiber A-Counts within the cable sheath at each terminal splice or cut-in location.

Figure 2:
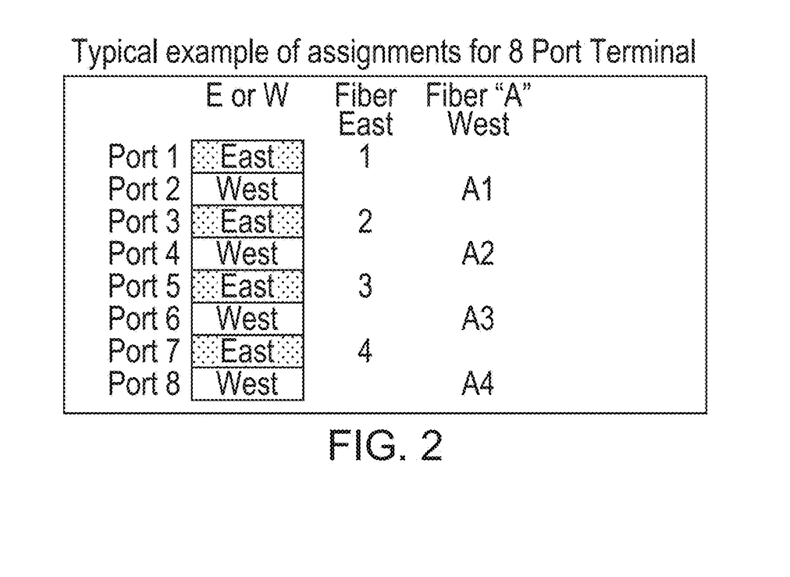
FIG. 2 is a chart depicting typical port assignments for an eight (8) port terminal used in a GPON.

The design calls for the termination of at least two (2) ports in each terminal, so a terminal count is in multiples of two (2, 4, 6 or 8) for an eight (8) port terminal. This enables use of both sides of the strand of optical fiber (East and West). A typical port assignment is depicted in FIG. 2.

Figure 3:
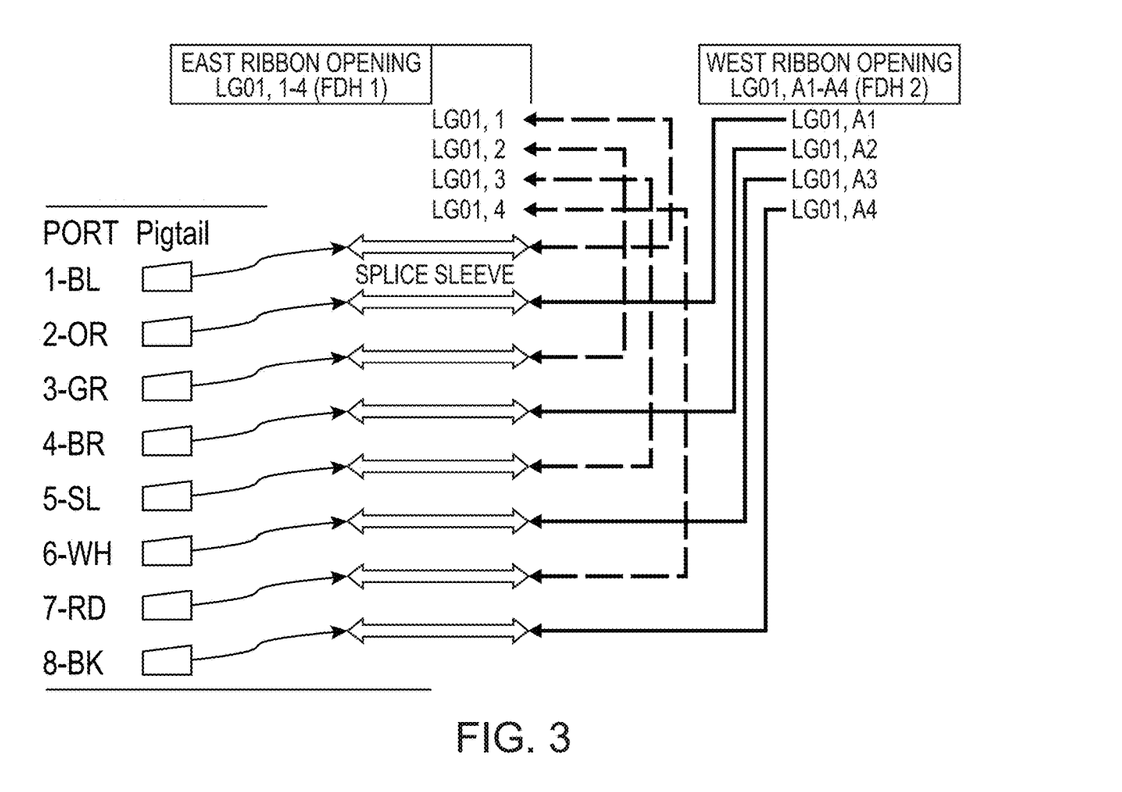
FIG. 3 is a diagram depicting splicing arrangements for distribution cables spanning between fiber distribution hubs (FDH) within a GPON.

In order to accomplish the splicing, the terminal connections of the optical fiber (commonly referred to as "pigtails") are spliced to the optical fiber. Splicing may be by, for example, mechanical techniques or by fusing to each side of the strand of optical fiber. Thus, the ports are looped back on themselves using a port compatible fiber loop back plug or compatible fiber jumper. The loop back plug or jumper can be eliminated by mating each pigtail connector together using a compatible port bulkhead or alignment sleeve. For example, pigtail connectors LG 01 Fiber 1 would be barreled or looped to LG 01 Fiber A1, 2 to A2, 3 to A3, and 4 to A4 in an eight (8) port scenario. See FIG. 3 for a conceptual level illustration.

In one embodiment, the pigtails remain looped back until fiber characterization testing has been completed. At this point, the loop back plugs, jumpers or bulkheads are removed, capped with dust covers, retained and reused for the next East-West build.

Architecture of the GPON can be modified to include multiple FDH that can be connected together to provide diverse feeds from the Central Office base GPON equipment. In some of these embodiments, each FDH may be linked with a dedicated restoration fiber connection, such as a ribbon with twelve (12) or more optical fibers coupled between each FDH. These linking strands of optical fiber can be used as a pass through feed for PON optical fibers if the subtended FDHs cannot be fed diversely. In order to improve system reliability, each linked FDH may be fed diversely from the Central Office GPON equipment and the linking optical fibers may be used for restoration purposes only.

Figure 4:
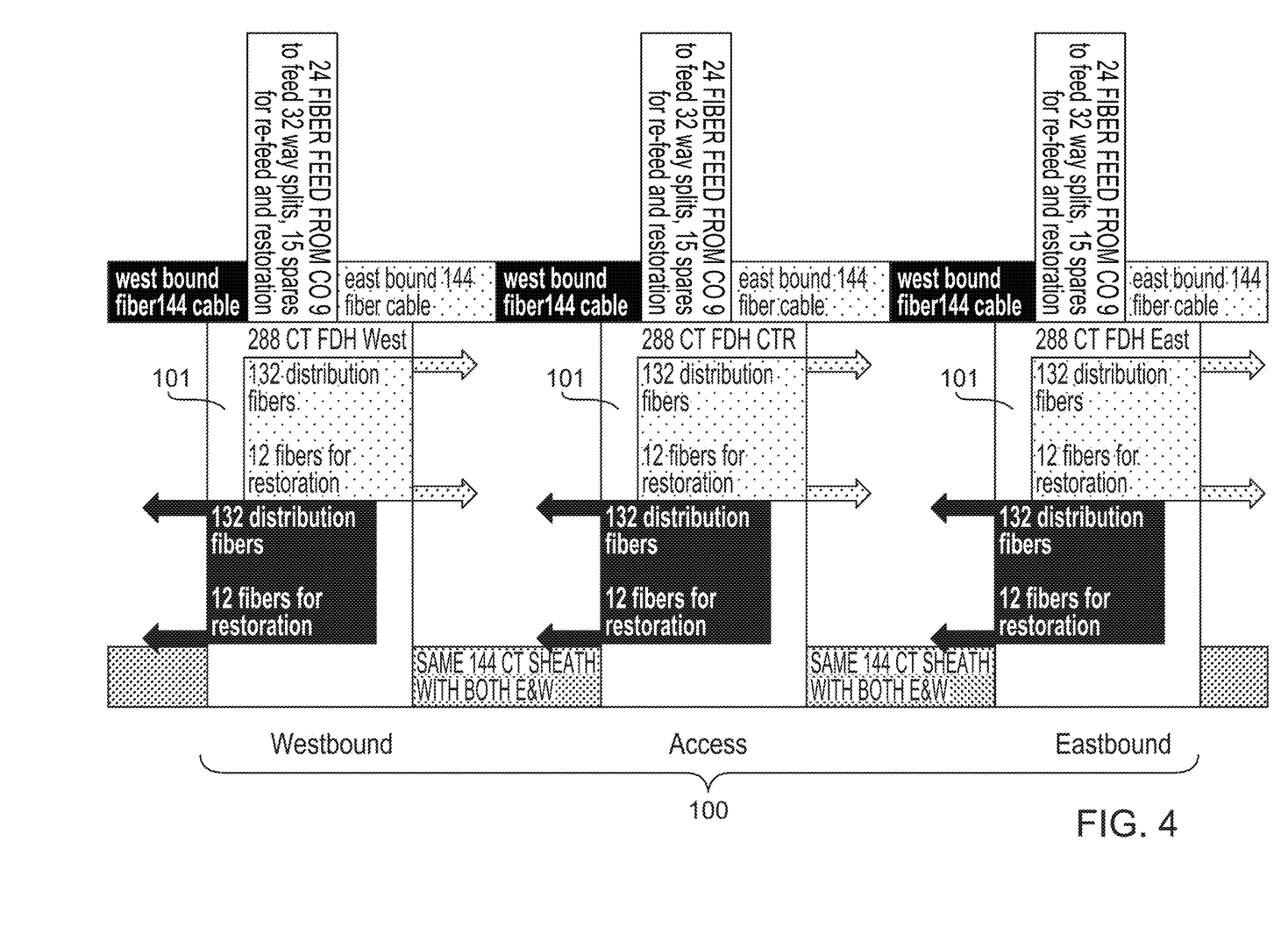
FIG. 4 is a diagram depicting fiber assignments for a GPON implementing a design as disclosed herein.

Referring now to FIG. 4, aspects of an exemplary embodiment are illustrated. In this illustration, the GPON 100 includes three FDH 101 units. Each FDH 101 includes 288 distribution ports (or "counts"), with 144 count distribution cables 104 feeding in two directions ("East" and "West") from each of the three FDH 101. The optical splitter used is a 1×32 way optical splitter. Thus, nine (9) 32 way splitters would be needed for each FDH 101 in order to meet capacity (to use the 288 distribution ports) when using a centralized splitter configuration.

In the example, each FDH 101 is fed with nine (9) PON feed fibers 110 and fifteen (15) spares from the Central Office (24 total feed fibers 110 and 288 distribution fibers 104 in two separate 144 count sheaths). The 144 count cables will feed East and West of the respective FDH 101 to each adjacent FDH 101. In this embodiment, each of the 144 fiber cables will include twelve (12) spare fibers reserved for fiber restoration or pass-throughs to each subtended FDH 101. In this embodiment, a break in the distribution fiber 104 will only affect service on half of each terminal. As illustrated, all terminal counts in this example share fiber equally in East and West distributions.

In this embodiment, the design provides an alternate route to re-feed the splitter when required without reprogramming GPON services to another PON. The design streamlines restoration efforts by pre-staging diverse alternate fiber paths which are available in the event of an outage on the original fiber path feeding each FDH. This is advantageous as most traditional GPON networks currently deployed do not provide for a service and protect redundant pathways that can fail-over to "protect mode" in the event of loss of service on the active path. In these systems, the expense of providing two redundant paths for each customer would more than double the costs of construction, materials, and equipment and maintenance costs.

The design helps to build in diverse recovery paths in the event of severed optical fiber. This is possible, among other things, due to the network of linked FDH 101. This allows for the "rolling" of PON from the affected optical fiber to another undamaged optical fiber at the central office and the FDH splitter location. This permits the system operator to "patch around" a break in the distribution fiber 104, even before personnel are activated to repair the damaged optical fiber in the field. If all optical fibers of the feeder cable 110 to a given FDH 101 have been severed, adjacent linked FDH 101 can re-feed the out-of-service (OOS) FDH 101 by rolling the PON to the adjacent FDH 101 and patched over to the OOS FDH 101. Once the PON has been rolled over to the OOS FDH 101, the splitters can be rolled to the newly activated linking optical fibers, restoring all downstream subscribers 150 before recovery efforts have been completed.

The design adds extra reliability to an unprotected architecture without the expense of a conventional redundant design and provides for rapid service recovery of the Central Office feeder cable 110 serving the FDH(s) 101. The design also limits the impact of a severed distribution fiber 104 between two adjacent FDH 101 to less than 50% of all customers in that sheath due to the East-West design. By utilizing the same sheath, the East-West terminal counts and dual FDH 101, the design builds in a certain level of redundancy, or at the least, resilience and survivability and nearly doubles the capacity of each fiber sheath at no additional cost per homes passed.

Figure 5:
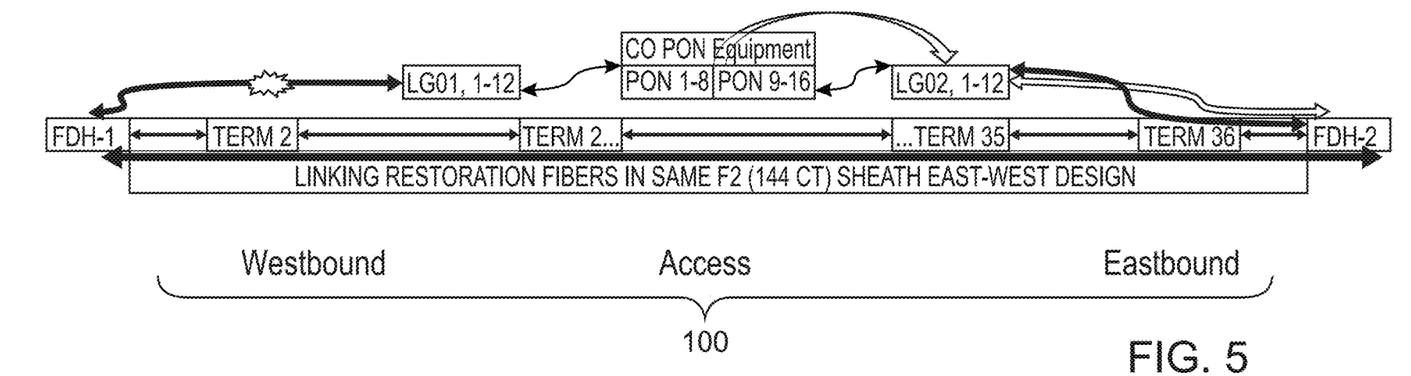
FIG. 5 is a diagram depicting restoration of communications within a GPON implementing a design as disclosed herein and that has suffered a severed feed cable.

Turning to FIG. 5, there is illustrated aspects of a scenario involving damage to the feeder cable 110. In this example, LG01, fibers 1-12 are severed between the central office PON equipment and FDH-1. As a result, 132 customer ONT fed from FDH-1 are out-of-service, LG01, fibers 1-5 go out-of-service as well. PON ports 1-5 enter into a loss of signal (LOS) alarm. All services fed from FDH-1 at all terminals (1-36) are affected and out of service (132 subscribers) while all services fed from FDH-2 at all terminals (1-36) are unaffected and in-service (132 subscribers). As a result, personnel are dispatched to the failure location to effect repairs. The personnel will then patch PONS 1-5 to spare feeder fibers LG02, 6-10 and notify an individual assigned to splicing duties (i.e., a "splicer"). The splicer will check for light on LG02, 6-10 and temporarily patch to dedicated linking fiber LF01 count 1-5 at FDH-2. The splicer will travel to FDH-1 and check for light on LF01, 1-5 and roll the five splitters from LG01 1-5 to LF01, 1-5. All 132 subscribers on FDH-1 will restore once each ONT ranges in (30-90 seconds) with the GPON equipment. Once the LG01 fibers 1-12 have been repaired and tested, the splicers and co techs may "roll" the services back off LF01 1-5.

Recovery of a severed distribution cable 104 may involve the replacement of the damaged section of the fiber (commonly referred to as "piece out") or if the fiber damage exceeds more than one section, multiple sections of fiber and any intermediate out-of-service terminals will need to be replaced. The repair section(s) will require two lap splices to be "cut in" at each end of the damaged section. If possible these high count (96 or higher) lap splices can be brought down to the ground for rapid recovery. This will require extra slack fiber to reach the ground and each splice closure and coordination between personnel. An example of a scenario for repair of a severed distribution cable 104 is depicted in FIG. 6.

Figure 6:
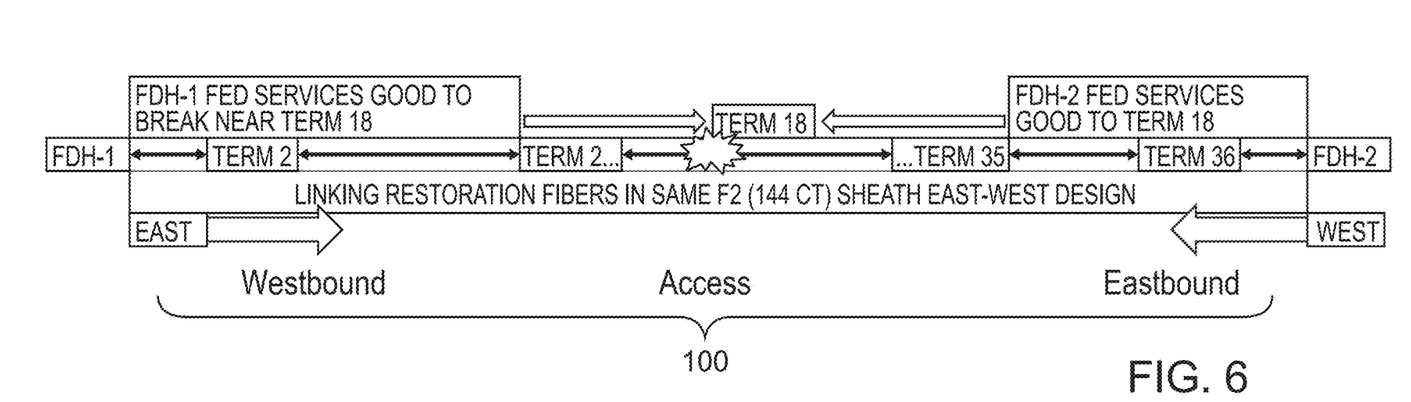
FIG. 6 is a diagram depicting restoration of communications within a GPON implementing a design as disclosed herein and that has suffered a severed distribution cable.

Turning to FIG. 6, there is illustrated aspects of a scenario involving damage to the distribution cable 104. In this example, the feeder cables 110 serving FDH-1 and FDH-2 are intact. The distribution cable 104 is damaged between termination 2 (term2) and termination 18 (term 18). Alarm analysis can pinpoint damage to each terminal bracketing the fiber issue. All East bound workers fed from FDH-1 will be unaffected up to the break in the distribution cable 104, while the Eastbound workers beyond the severed distribution cable 104 are out-of-service as a result. All westbound workers from FDH-2 will unaffected up to the severed distribution cable 104, workers beyond the severed distribution cable 104 are out-of-service as a result. The East-West design minimizes failures resulting from a break to the distribution cable 104, impacting only about 50% of the total customers in the span.

Figure 7A:
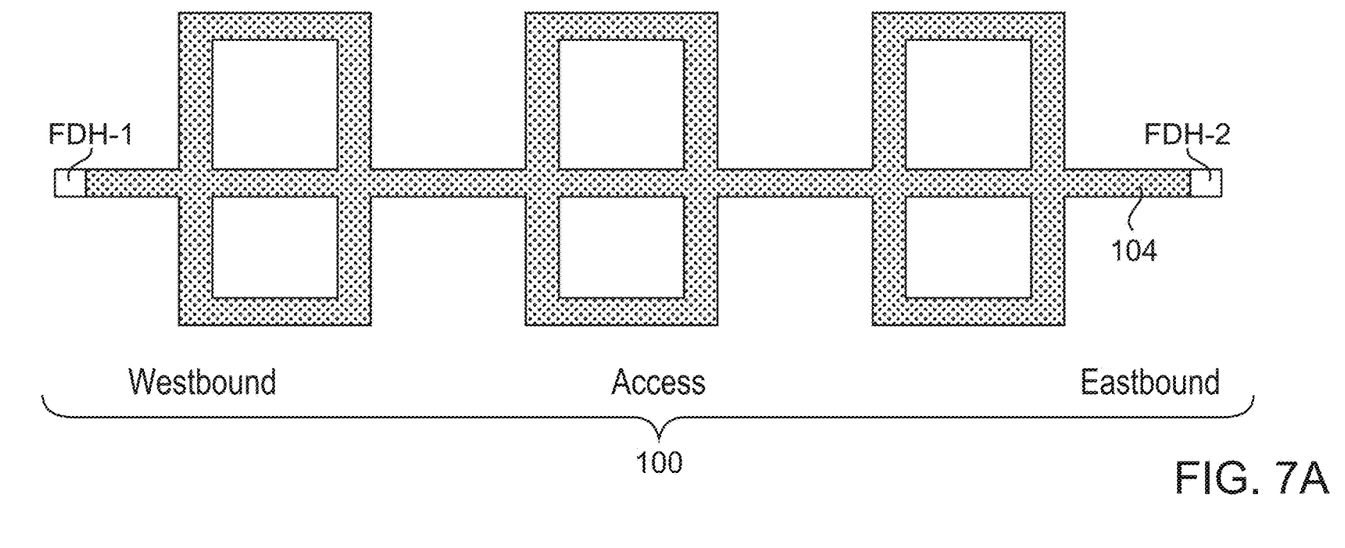
FIGS. 7A, 7B and 7C, collectively referred to herein as FIG. 7, are diagrams depicting aspects of resulting from splicing of a distribution cable according to the teachings herein.
Figure 7B:
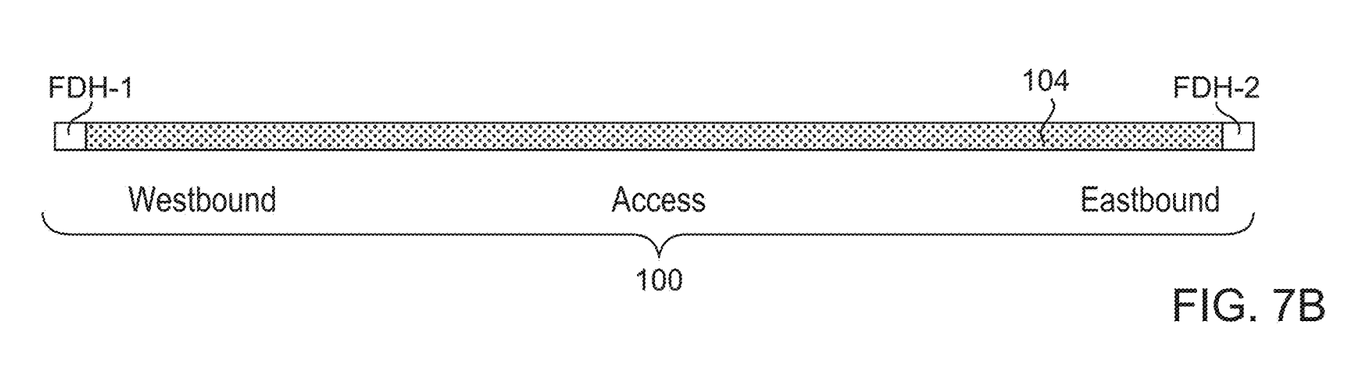
Figure 7C:
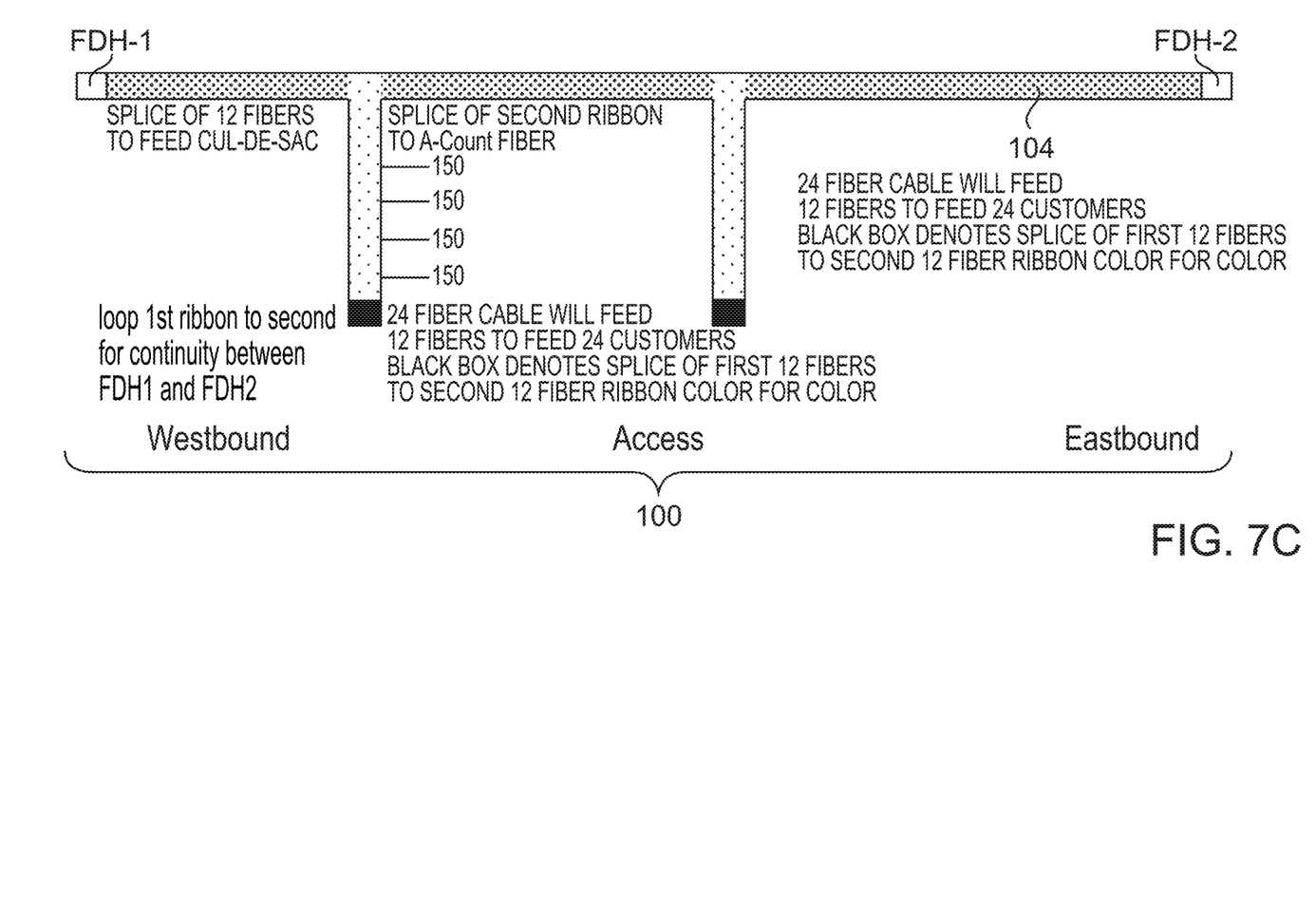

FIG. 7 depicts aspects of an implementation of a GPON configured according to the teachings herein. In FIG. 7A, a conventional loop design is shown. This is provided to service a series of subscribers, such as those on a cul-de-sac. FIG. 7B depicts a distribution cable 104 spanning from the first FDH 101, FDH1 to the second FDH 101, FDH2. In FIG. 7C, two side legs are depicted, and include splices therein.

Having thus introduced embodiments of the design for implementation of gigabit passive optical networks (GPON), some additional aspects are now presented.

The design also allows for two or more FDH's to be fed from diverse paths from the Central Office GPON equipment.

The design provides flexibility to feed each FDH from diverse paths in a service mode and re-feed each FDH from another path on reserved fibers between each FDH when fiber feeds fail or are "open."

The design also allows for the patch-through of Central Office PON feed fibers to feed other subtended FDH's that cannot be fed directly from the central office based fibers. Although this may create a less diverse fiber routing, this design may be called for due to field conditions.

Advantageously, the design provides for a doubling of subscribers without the use of the reserve fibers between FDH's, or near doubling by reserving the first fiber ribbon in each sheath as a back-up spare for repair and re-feed purposes.

The design doubling by use of the A-Counts (West) in each sheath, thus allowing personnel to feed each terminal from two or more diverse paths (East & West) and provides for increased reliability of up to 50% if either path fails.

The design incorporates the use of "barreling" using a bulkhead port or small jumpers to temporarily "loop through" connect each fiber strand at each terminal, allowing the fiber characterization or end to end testing to be performed at each FDH (East and West).

The design allows for the use of bi-directional optical time-domain reflectometer (OTDR) and loss testing to test and document the continuity of the fibers between the FDH's and identify any anomalies and high loss events in the fiber spans to characterize the fiber before services are turned up. An example of a suitable instrument is the VIAVI Tberd 2000, and Fiber Connect Options (FB2-FCOMP2-MA) 2 sets required for Bi-Directional Fiber Characterization, available from Viavi Solutions, Inc. of Milpitas, Calif.

This design creates fiber characterization labor savings and costly setup time between each terminal port and the FDH. The design allows for the removal of the loop through jumpers at the conclusion of the successful fiber characterization testing. The design also will work with either a centralized optical split, distributed (cascading) splits or both, to further maximize customers fed by the available fibers within the sheath.

In traditional point to point GPON fiber architecture, each fiber is terminated with a connector at the terminal and the FDH, which requires the fiber strand to be cut and spliced through to a pigtail which feeds the respective ports or fiber connection access points. In a traditional terminal cut in location, the assigned fiber will be cut in half, and only one side (West) will be terminated to the port pigtail, and the East side will be cut dead ahead (A-count) in the sheath and left un-terminated and underutilized. In contrast, the design disclosed herein eliminates this wasteful practice and terminates the unused fibers in the A-count to another port pigtail in the same terminal (an eight (8) port terminal in this design would use fibers 1-4 and fibers 1A-4A). In order to provide a more diverse terminal count, some embodiments of the design recommend that all odd ports be terminated to fibers 1-4 and even port pigtail be spliced through to the Eastbound fibers (former A-counts) (for example, Port 1-fiber 1, Port 2-fiber 1A, Port 3-fiber 2, Port 4-fiber 2A . . . Port7-fiber 4, Port 8-Fiber 4A). Adjacent ports can be looped back more easily and consecutive port assignments may force alternating the serving FDH, building in diverse routing of each GPON circuit.

In some embodiments, the assignment of each port 1-8 is consecutive to spread the working circuits across both FDHs to provide the most robust diverse deployment to each terminal.

In some embodiments, the design calls for the termination of both the East and West fibers to the terminal ports, with half of the ports cut in to the East Side and the other half cut in to the West side. In this configuration, a 144 count fiber cable can feed up to 288 individual customers. This design may reserve a twelve (12) fiber ribbon which would reduce the total number of customers to be fed from a 144 Count fiber from 288 to 264, to create a more resilient network that can be more readily restored.

Additionally, the design may be used to maximize usage of any optical fiber cable. Advantageously, the design lends itself to reduced fiber count cables to provide service to nearly twice the number of subscribers in a wider serving area.

The design may be implemented in lieu of the trend of placing larger and larger fiber cables for GPON deployments, which are often in short supply, with some higher count cables requiring lead times of six (6) months or more from the fiber cable manufacturers and suppliers.

The design may be implemented in aerial or buried service configurations. Aerial environments (pole line) in single runs down a single street or with side legs or cul-de-sac deployments are advantageous as lines are easily accessed.

This design effectively reduces the placing cost per homes passed by almost 50% and fiber cable costs by 50% per homes passed and splicing Fiber Characterization End to End testing labor by 75-90% at only two (2) locations (FDH1 and FDH2) instead of the normal thirty six (36) aerial eight (8) port terminal locations.

Fiber characterization can be performed using a pair of off the shelf Optical Time Domain Reflectometers (OTDR) and associated software and documentation packages such as the VIAVI T-Berd 2000's and the Fiber Complete software package. In-line fiber terminals such as the AFL-1642-XL 8 Port Aerial terminal are examples of non-proprietary inline terminals that do not require proprietary custom fiber drop cables and can utilize field connectorized fiber drops using low loss SC-APC or SC-UPC mechanical connectors (AFL FastConnects) to economically connect the terminal port to the customers premise Fiber NID (Network Interface Device).

The design may incorporate the use of new cable sheaths specifically placed to distribute fibers in the GPON serving area, and does not preclude the use of dark fiber for the delivery of any other existing or future non-GPON based optical services to each residential or business location passed.

The design may include an end to end fiber span with one low loss fusion pigtail splice at the FDH and another low loss fusion splice (<10 dBm) at the pigtail in the terminal unless there is an intermediate low loss lap splice in the span required due to field conditions.

When the East and West spans are coupled with a fiber loopback plug, jumper or barrel and viewed with an OTDR from each terminated FDH location, the mechanical connections can be clearly seen, measured to (distance to reflection) and quantified and Pass or Fail determinations can be made.

With this design, normal end-to-end fiber characterization testing from each port in every terminal back to the FDH is no longer required. Due to the fact that all 144 fibers in the sheath are roughly the same length and inherent losses at specific test wavelengths, and each have the same number of low loss fusion splices and the same loopback reflection at each terminal, the overall end to losses when tested between each FDH, any anomalies can be detected, located and corrected. The location of the loopback or terminal on the OTDR traces will vary based on the terminal location on the fiber span, but all acceptance testing (fiber characterization testing) may now be performed at only two locations (FDH1 and FDH2) instead of a minimum of thirty three (33) to thirty six (36), thus avoiding time consuming end-to-end tests performed at each eight (8) port terminal location on that 144 count span.

The design allows for the bi-directional test to be performed at two ground based FDH's in most applications, in all weather conditions as opposed to thirty six (36) or more aerial terminal test location that may require traffic control personnel during fair weather testing. The removal of the loopback, jumpers or bulkheads following testing will still be required but will not involve OTDR testing or substantial labor at each terminal.

Although certain example methods, apparatus and articles of manufacture and design have been described herein, the scope of coverage of this disclosure is not limited thereto. On the contrary, this disclosure covers methods, apparatus and articles of manufacture and design falling within the scope of the appended claims either literally or under the doctrine of equivalents.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. For example, it should be recognized that a virtually infinite number of configurations for the GPON may be realized. For example, components may be varied according to a number used or installed, by style of connection, type of connection, wavelengths employed (or not employed), by geometric orientation and/or geographic location, and by other such variables. Other components not introduced herein and known to be used in conjunction with GPON technology, or later devised to work with GPON technology may be used as deemed appropriate.

Generally, modifications may be designed according to the needs of a user, designer, manufacturer or other similarly interested party. The modifications may be intended to meet a particular standard of performance considered important by that party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical network, comprising:
at least one strand of a plurality of strands of optical fiber optically connected to a first fiber distribution hub and an access terminal, the same at least one strand optically connected to a second fiber distribution hub and the same access terminal, the at least one strand thus providing a full duplex optical path in a first direction from the first fiber distribution hubs to the access terminal and in a second direction from the second fiber distribution hub to the same access terminal.

2. The optical network as in claim 1, wherein the strand of optical fiber comprises a single-mode optical fiber.

3. The optical network as in claim 1, wherein the optical connecting of the strand comprises a splice to the strand.

4. The optical network as in claim 3, wherein the splice comprises one of a fiber loop back plug and an optical fiber jumper.

5. The optical network as in claim 3, wherein the splice comprises an optical connection to a pigtail of the strand.

6. The optical network as in claim 1, further comprising at least another fiber distribution hub optically linked to at least one of the fiber distribution hubs.

7. The optical network as in claim 6, wherein the fiber distribution hub optically linked to at least one of the fiber distribution hubs are configured in an East-West distribution design.

8. A method for providing communications service on an optical network, the method comprising:
configuring the network with a plurality of strands of optical fiber that are optically connected to at least a first fiber distribution hub and an access terminal, and optically connecting each one of the strands to a second fiber distribution hub and the same access terminal, each of the strands thus providing a full duplex optical path in a first direction from the first fiber distribution hubs to the access terminal and in a second direction from the second fiber distribution hub to the same access terminal;
communicating optical signals through the plurality of strands of optical fiber; and
upon loss of service to a subscriber on a communications pathway of a strand of the plurality of strands of optical fiber, switching communication from the first fiber distribution hub to the second fiber distribution hub to restore service on the same strand to the subscriber.

9. A method for configuring an optical network, the method comprising:
optically connecting at least one strand of optical fiber to a first fiber distribution hub and optically connecting the at least one strand at an access terminal; and
optically connecting the same at least one strand to a second fiber distribution hub and optically connecting the at least one strand at the same access terminal, the at least one strand thus providing a full duplex optical path in a first direction from the first fiber distribution hubs to the access terminal and in a second direction from the second fiber distribution hub to the same access terminal.

10. An optical network, comprising:
a plurality of strands of optical fiber optically connected to a first fiber distribution hub and an access terminal, each of the strands of the plurality of strands optically connected to a second fiber distribution hub and the same access terminal, the plurality of strands thus providing a full duplex optical path in a first direction from the first fiber distribution hub to the access terminal and in a second direction from the second fiber distribution hub to the same access terminal;
wherein one strand of the plurality of strands provides services to a plurality of subscribers on the network.

* * * * *